March 28, 1950     J. M. POCHÉ     2,502,024
ALL PURPOSE TRAILER
Filed Feb. 12, 1946     4 Sheets-Sheet 1
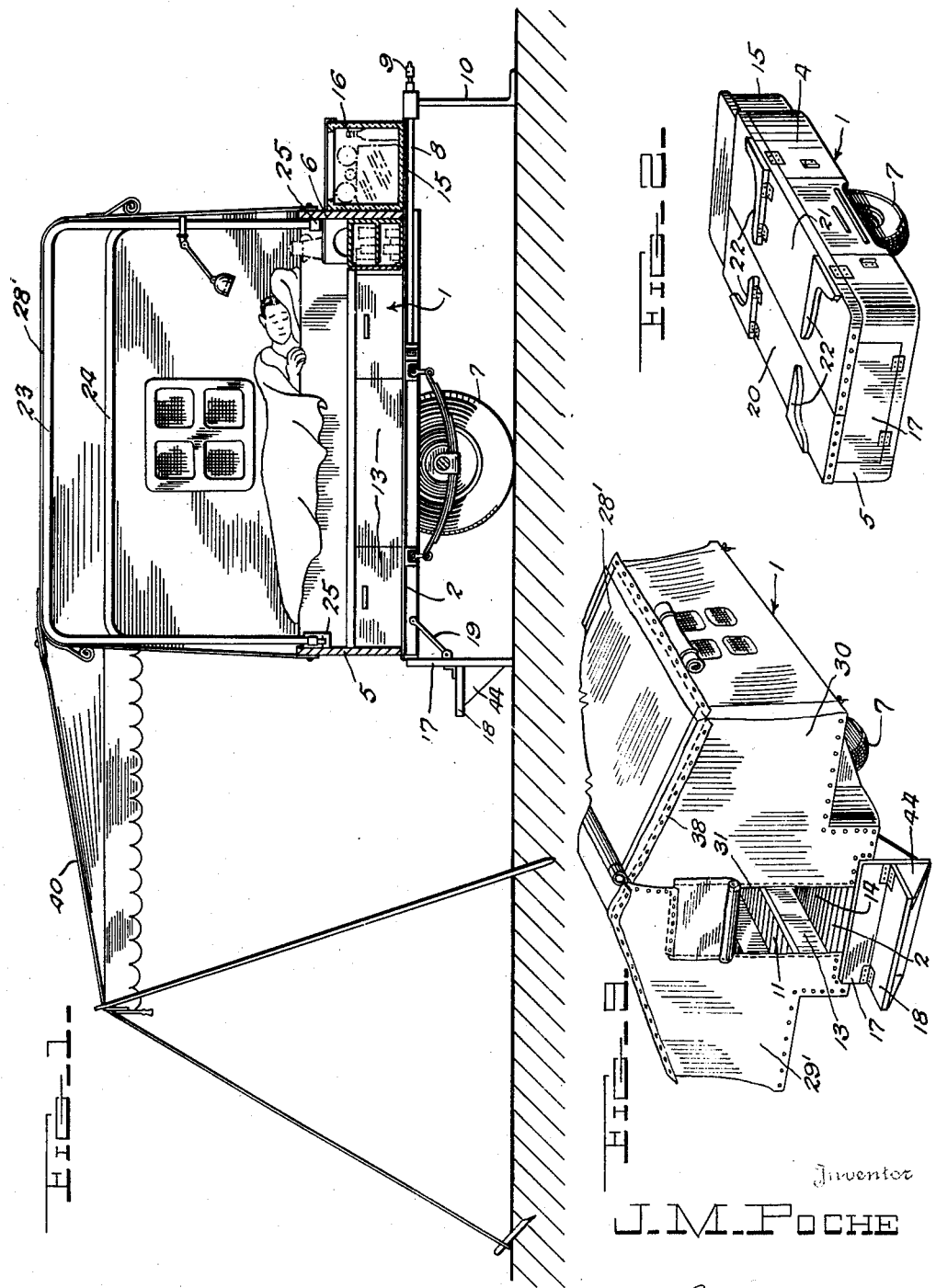
Inventor
J. M. Poché
By Mason Fenwick & Lawrence
Attorneys

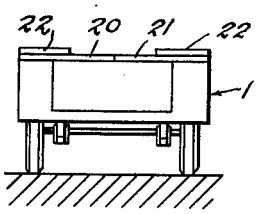
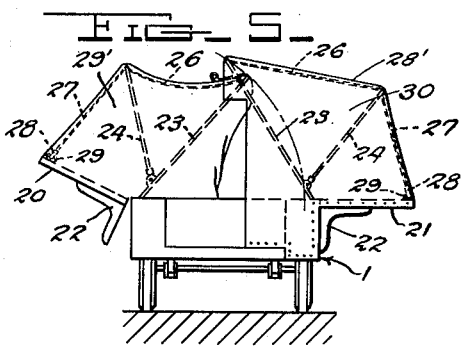
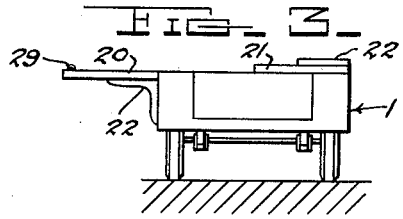
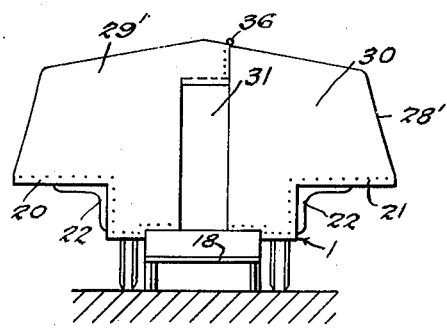
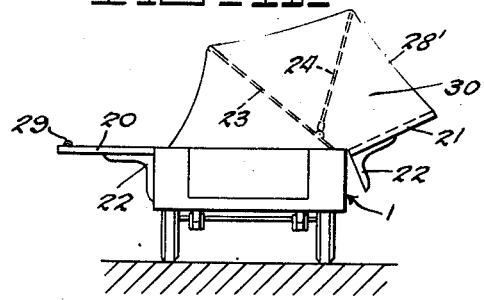
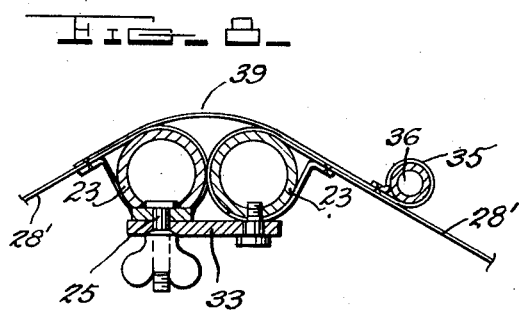
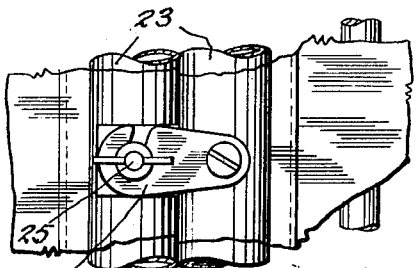

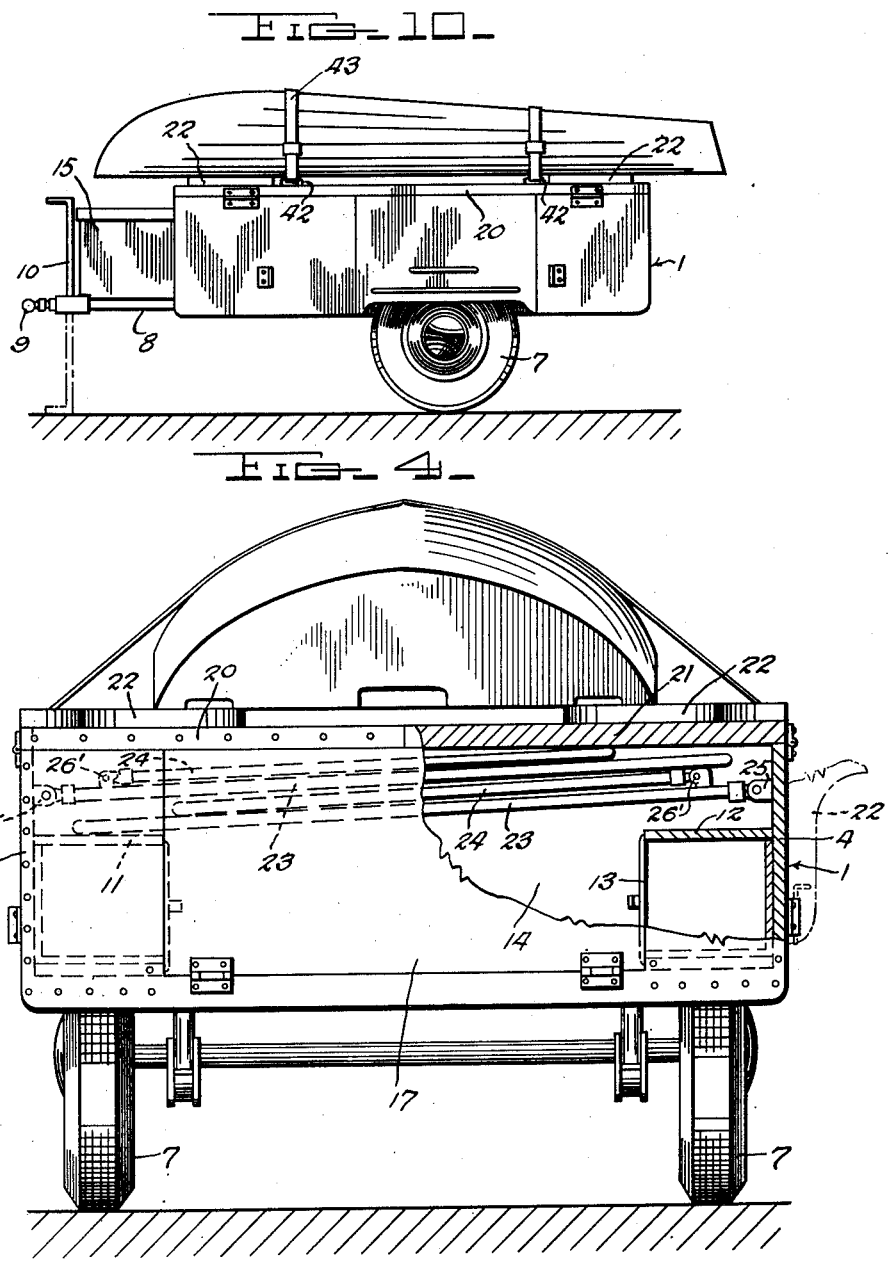

March 28, 1950 J. M. POCHÉ 2,502,024
ALL PURPOSE TRAILER
Filed Feb. 12, 1946 4 Sheets-Sheet 4
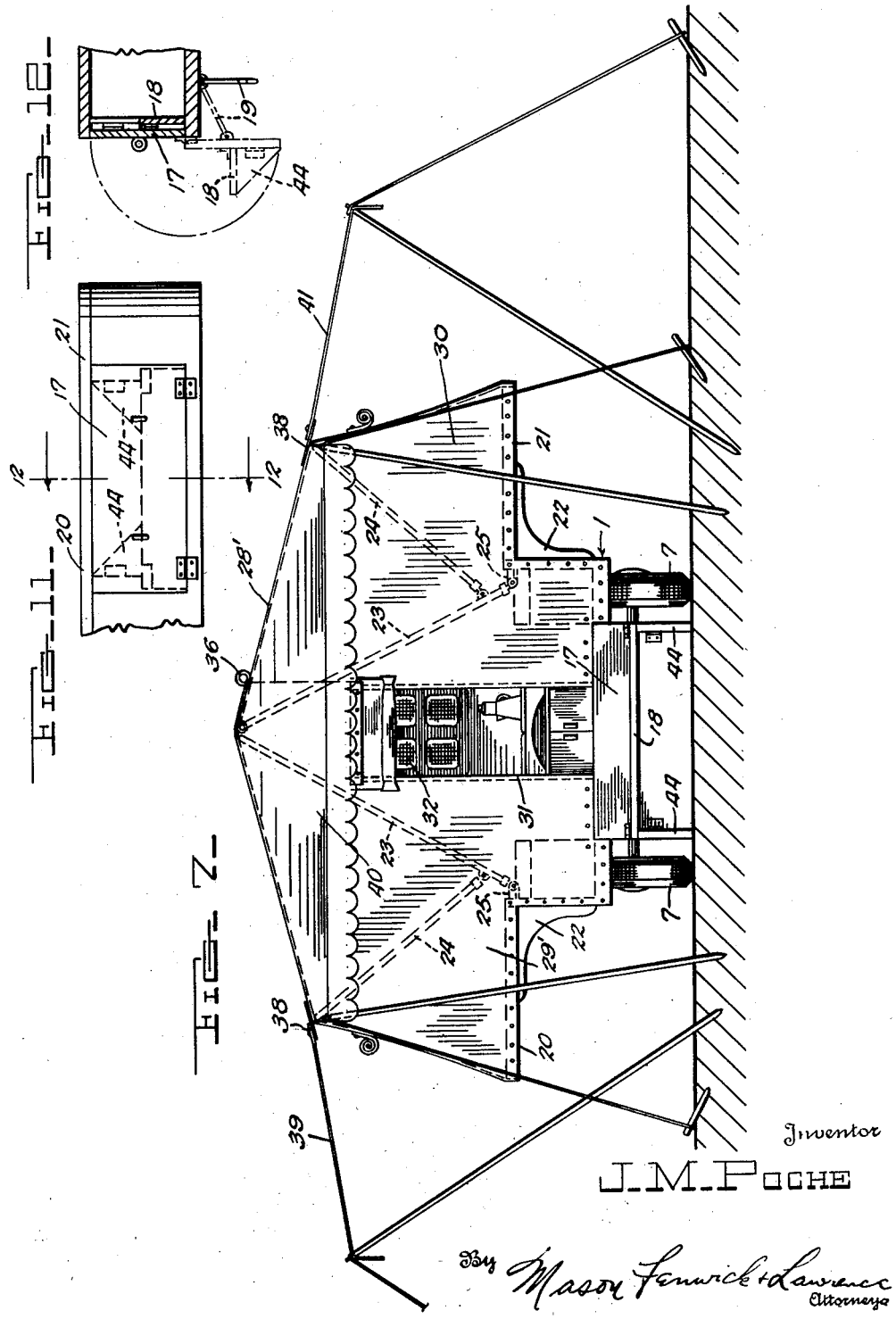
Inventor
J. M. POCHE
By Mason Fenwick & Lawrence
Attorneys Patented Mar. 28, 1950

2,502,024

UNITED STATES PATENT OFFICE 2,502,024

ALL PURPOSE TRAILER

John Morris Poché, New Orleans, La., assignor to Higgins, Incorporated, New Orleans, La., a corporation of Louisiana Application February 12, 1946, Serial No. 647,034

5 Claims. (Cl. 296—23)

This invention relates to trailers for camping and general purposes.

One of the objects of the invention is to provide a trailer of the box body type, having cover panels hinged along opposite sides and meeting in the longitudinal middle forming a closure for the body, when folded, and bunk extensions when extended.

Another object of the invention is to provide a trailer as described, having hinged collapsible canopy frames hingedly mounted on the inside of the body below the plane of the top which normally stow beneath the cover panels when collapsed, and which automatically fold out, each spreading one-half of the canopy and supporting it in spread position, when the cover panels are swung to extended position.

A further object of the invention is the provision of a trailer having a body in which is stored a foldable sectional housing which may be erected readily when a pair of hinged sections forming a cover for the body are swung outwardly through 180 degrees with foldable means for supporting the sections at right angles to the side walls of the body.

A still further object of the invention is the provision of a trailer body so constructed that it will store compactly not only a canopy which may be readily erected when the sections of a cover for the body are opened and properly positioned, but all the necessary equipment for camping, the top of the cover when closed being employed for transporting a boat or other accessories.

Other objects of the invention will appear as the following description of a preferred and practical embodiment thereof proceeds.

In the drawings which accompany and form a part of the specification:

Figure 1 is a longitudinal vertical section through the trailer, showing the same expanded into the position to form living quarters;

Figure 2 is a perspective view of the trailer in fully folded position for transportation;

Figure 3 is a somewhat diagrammatic end elevation illustrating the first step in expanding the trailer;

Figure 4 is an end elevation partly in section, showing the folded position of the canopy frames beneath the closed cover panels;

Figure 5 is a somewhat diagrammatic view showing one of the canopy sections in erect position and the other in position approaching erection;

Figure 6 is a view similar to Figure 5, showing both canopy sections fully erect;

Figure 7 is a front end elevation illustrating the trailer in fully expanded position in connection with auxiliary tent flies and securing means;

Figure 8 is a fragmentary view in vertical section, showing means for securing the contiguous bows of the canopy frame together;

Figure 9 is a perspective view illustrating partly the foldable step constituting a ground support;

Figure 10 is a side elevation of the trailer in folded position for towing, including a boat overlying the longitudinal line of division between the closed cover panels;

Figure 11 is a fragmentary view showing the tail gate in closed position, the position of the step being indicated in broken lines;

Figure 12 is a fragmentary view taken in section along the line 12—12 of Figure 11, indicating in broken lines the step and tail gate when the latter is in open position;

Figure 13 is a somewhat diagrammatic view in end elevation, showing the cover panels in closed position;

Figure 14 is a similar view illustrating one of the cover panels in open position detached from the corresponding canopy section, to permit the unfolding of the opposite canopy section;

Figure 15 is a fragmentary bottom plan view of the securing means shown in Figure 8.

Referring now in detail to the drawings, the numeral 1 represents the trailer body as a whole, comprising a floor or platform 2, the sides 3 and 4 and ends 5 and 6. The body is spring supported from the vehicle wheels 7. It has a tongue 8 projecting forwardly, with a trailer hitch 9 at its end, and a ground support 10 which can be swung upwardly when the trailer is hinged to a motor vehicle. The body 1 has seats 11 and 12, extending lengthwise against the respective sides 3 and 4, the space beneath said seats being occupied by drawers or lockers 13. There is a wide aisle 14 between the seats. The floor or platform extends forwardly of the front end 6, above the tongue 8, forming a ledge 15 upon which any accessory cabinet may be mounted, such as the icebox 16. The details so far described are more or less conventional in trailers of this type.

The rear end 5 is provided with a tail gate 17, hinged at the level of the platform and swingable downward vertically until it touches the ground, forming a ground support complementary to the member 10. At an intermediate height on its outwardly facing side when in let-down position, the tail gate has a step 18. This step is hinged transversely so as automatically to swing down into horizontal position when the tail gate is lowered, and to lie flat against the tail gate on the inside of the body when the tail gate is in raised position. Step supports 44 are hinged to the under side of the step, which depend by gravity when the step is in lowered position, and have free edges perpendicular to the step and flush with the rear edge thereof, which engage the tail gate and support the step in horizontal position. When the tail gate is closed, the supports 44 may be folded back flat against the step. The tail gate is suitably supported in its downwardly vertical position by means of a detachable brace 1a.

The body 1 is provided with a pair of cover panels 20 and 21, extending longitudinally and hinged to the sides of the body at the top. The cover panels fit neatly upon the top edges of the body and their adjacent edges come neatly together so as to form a substantially weatherproof joint. The cover panels in closed position are shown in Figure 2.

The cover panels are swingable outwardly through an arc of 180 degrees, to assume the position shown by one of them in Figure 3. On top of the cover panels lie the supporting brackets 22, transversely hinged and having their tops coincident with the longitudinal edges of the cover panels. When the latter are swung outwardly, the brackets hang gravitationally in the vertical position shown in Figure 3, with their free sides against the sides of the body, thus rigidly supporting the cover panels 20 and 21 in horizontally extended position. When thus positioned, they serve as bunk extensions.

Figure 4 shows that the level of the seats 11 and 12 is below the top of the body, forming spaces between the seats and the cover panels when closed. This affords room for the transverse stowing of the canopy frames. There are two pair of these, each pair consisting of a main bow 23 and an intermediate bow 24. The shape of the bows is shown in Figure 1, each comprising three sides of a rectangle, with the corners slightly rounded. The top portions of the bows extend substantially the length of the body. The ends of each main bow are pivotally mounted in longitudinal alignment to the sides of the body near the ends in the bearings 25. The free ends of the intermediate bows are mounted in longitudinal alignment in bearings 26', carried by the main bows adjacent their respective pivotal mountings. The intermediate bows are somewhat shorter than the main bows, as shown in Figure 4. At longitudinal intervals, the bows of a pair are connected in proper spaced relation by parallel cords or strips of webbing 26, so that the main and intermediate bows are tethered by said cords or webbing, whereby the extent to which they may separate is determined. The cords or webbing extend in tails 27, from the intermediate bows, having snap hooks 28 at their ends, by which they may be attached to the rings 29, secured inwardly of the longitudinal free edges of the bunk extensions. The intermediate bows are thus tethered with respect to the bunk extensions, and the distance which they may separate from the bunk extensions is thus determined. From the foregoing, it will be understood that when the canopy frames are in the collapsed position shown in Figure 4, the lengths of cord or webbing connecting them are casually looped, but that when the ends of the tails 7 are secured to the cover panels and the latter are swung out to form bunk extensions, the canopy frames will unfold into the positions shown in Figure 5.

The canopy frames are provided with a canvas covering, consisting of a top sheet 28' for each pair of bows, lying on the outside of the cords or webbing, secured to the main bow 23, passing over the intermediate bow 24 and being of such length to extend slightly below the bunk extension when the canopy frame is in spread position. The lower longitudinal edge of the top sheet is foldable beneath the longitudinal edge of the bunk extension, and has snap fasteners which interlock with complementary means on the under side of the bunk extension. It will thus be understood that there is no cord or canvas attached to the free edge of the bunk extension, so that when said extensions are folded to form cover panels, their edges come close together in a substantially weather-tight manner. The canvas covering of the canopy frames also includes end portions 29' and 30, which freely hang when the canopy frames are unfolded, and are secured along their lower edges by snap fasteners to the adjacent structure of the trailer, as shown in Figure 6. The end portions at the rear are formed with a door opening 31, and at the front with a screened window opening 32, which is to be seen in Figure 7.

When it is desired to put up the canopy, the cover panel 21 is first thrown open to extended position so as to release the tops of the upper pair of bows 23 and 24 shown in Figure 4. The tails 27 of the cords 26 may already have been hooked to the rings 29 along the longitudinal edges of the other cover panel 20. This cover panel is then swung outwardly, tautening the tails, first pulling up the intermediate bow 24, and when the cords 26 have become tautened, pulling up the main bow 23. When the cover panel 20 is fully extended, the top of the bow 23 will be in the longitudinal median vertical plane of the trailer body. The lefthand half of the canopy is now erect, the top sheet of the canvas covering being spread taut. The cover panel 21 is next partly closed until it is possible to hook the tails 27 into the rings 29 on that panel. After this has been done, the panel 20 is extended, pulling up first the intermediate bow 24 and finally the main bow 23, until when the cover panel 21 is in fully extended position the tops of the two bows 24 lie contiguous. Both sides of the canvas cover have now been erected. The bows 23 are secured by any suitable clamping means, an example of which is shown in Figure 8, and consists of a notched latch 33, pivotally secured to one bow, the notch of which engages about a stud 25 on the other bow, a wing nut being employed for holding the latch in engaged position. There will be at least two of these securing means, one at each end. One of the top sheets of the canvas cover is provided with a flap having a tubular end 35, which contains a pole 36 to give it weight and hold it down. This flap is extended over the joint between the two halves of the canopy. Tie strings may be secured to the pole 36 and tied to grommets carried by the lower portion of the adjacent top sheet, to keep the flap 34 from being blown out of position.

Figure 9 shows that the top walls of the canopy are provided with overhanging peripheral eyelet flaps 38, to which various flies or awnings may be attached, three of which, 39, 40 and 41 are shown in Figure 7.

The cover panels 20 and 21 may be provided on their upper sides when closed, with the slotted cleats 42, through which straps 43 shown in Figure 10, may be passed for carrying a boat or any other desired items of luggage.

While I have in the above description disclosed what I believe to be a preferred and practical embodiment of the invention, it will be understood by those skilled in the art that the details of construction and arrangement of parts are by way of example and not be construed as limiting the scope of the invention.

What I claim as my invention is:

1. Trailer of the box body type having sides and ends, cover panels hinged along the longitudinal top edges of said sides meeting in the median vertical longitudinal plane of said body when closed, and swingable outwardly into the plane of the top of said body to form bunk extensions, a canopy consisting of two complementary sections each including a frame and a flexible cover attached to said frame, the latter being hingedly mounted in said body adjacent a respective side, said sections being contained in said body in collapsed condition beneath said cover panels when the latter are closed, said covers being connected to the respective cover panels so as to pull the frames into expanded complementary canopy forming position responsive to the opening movement of said cover panels.

2. Trailer of the box body type having sides and ends, cover panels hinged along the longitudinal top edges of said sides meeting in the median vertical longitudinal plane of said body when closed and swingable outwardly into the plane of the top of said body to form bunk extensions, a canopy frame consisting of two complementary collapsible sections, each section consisting of a main bow, said main bows being hinged within the body adjacent respective sides thereof, and an intermediate bow hinged to the main bow, flexible members tethering said main and intermediate bows and connectable to the adjacent cover panel near its free longitudinal edge for determining the spacing of said main bow from said intermediate bow and the latter from said cover panel when the section is extended, said sections being normally contained within said body beneath said cover panels, and being opened into extended complementary canopy forming position responsive to the movement of said cover panels from closed to fully open position, and a flexible cover for each section, secured to said bows, collapsible and extensible therewith.

3. Trailer of the box body type having sides and ends, cover panels hinged along the longitudinal top edges of said sides meeting in the median vertical longitudinal plane of said body when closed, and swingable outwardly into the plane of the top of said body to form bunk extensions, a canopy frame consisting of two complementary collapsible sections, each section consisting of a main bow, said main bows being hinged within the body adjacent respective sides thereof, and an intermediate bow hinged to the main bow, flexible members tethering said main and intermediate bows and connectable to the adjacent cover panel inwardly of its free longitudinal edge, for determining the spacing of the main bow from said intermediate bow and the latter from said cover panel when the section is extended, said sections being normally contained within said body beneath said cover panels and being opened into extended complementary canopy forming position responsive to the movement of said cover panels from closed to freely open position, a flexible cover for each section secured to said bows, collapsible and extensible therewith, and means for locking said main bows together.

4. Trailer as claimed in claim 3, the lower edges of said flexible covers being detachably connectable to the under side of said bunk extensions.

5. Trailer as claimed in claim 3, one of said flexible covers having a flap extending over the joint between said main bows, and a longitudinally disposed pole carried by said flap.

JOHN MORRIS POCHÉ.

REFERENCES CITED

The following references are of record in the file of this patent:

UNITED STATES PATENTS

| Number | Name | Date |
|---|---|---|
| 932,230 | Plan et al. | Aug. 24, 1909 |
| 1,340,761 | Fix | May 18, 1920 |
| 1,446,224 | Hans | Aug. 28, 1923 |
| 1,595,541 | Borah | Aug. 10, 1926 |
| 1,748,736 | Selje | Feb. 25, 1930 |
| 1,864,047 | Lawhorne | June 21, 1932 |
| 1,895,933 | Kuns | Jan. 31, 1933 |
| 2,152,713 | Stewart | Apr. 4, 1939 |

FOREIGN PATENTS

| Number | Country | Date |
|---|---|---|
| 191,287 | Great Britain | Jan. 11, 1923 |
| 301,612 | Great Britain | Dec. 6, 1928 |
| 498,162 | Great Britain | Jan. 4, 1939 |
| 678,703 | France | Jan. 2, 1930 |